No. 681,720. Patented Sept. 3, 1901.
A. L. MINIUM.
CREAM SEPARATOR.
(Application filed Apr. 23, 1900.)
(No Model.)
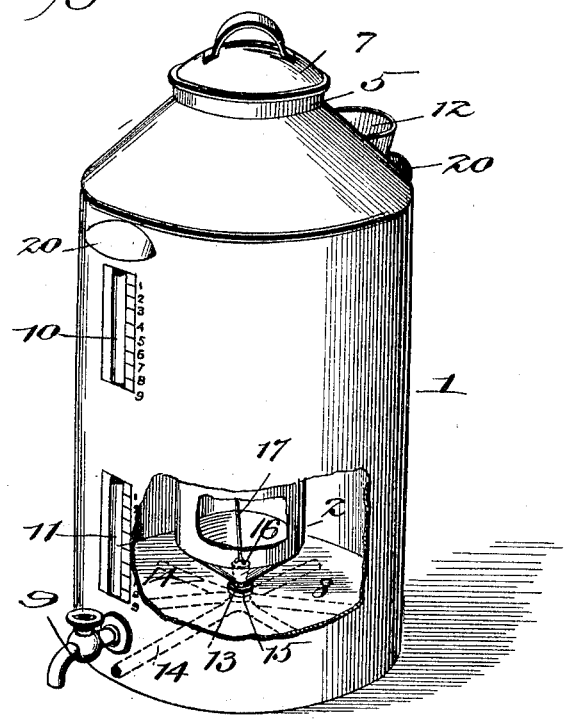
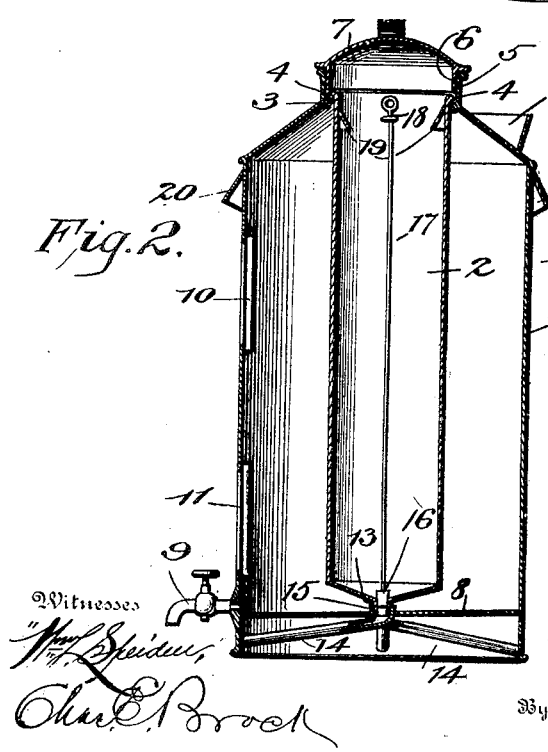
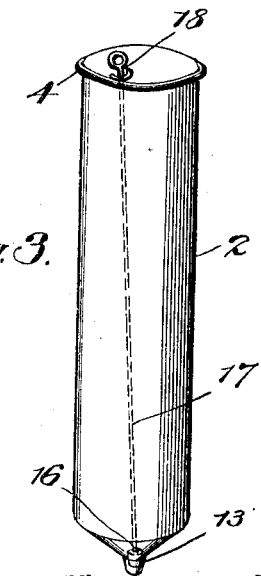
Inventor:
Allen L. Minium,

UNITED STATES PATENT OFFICE.

ALLEN L. MINIUM, OF DOWNING, MISSOURI.

CREAM-SEPARATOR.

SPECIFICATION forming part of Letters Patent No. 681,720, dated September 3, 1901.

Application filed April 23, 1900. Serial No. 13,973. (No model.)

*To all whom it may concern:*

Be it known that I, ALLEN L. MINIUM, a citizen of the United States, residing at Downing, in the county of Schuyler and State of Missouri, have invented a new and useful Cream-Separator, of which the following is a specification.

My invention relates to cream-separators, and more particularly to that class in which cold water or ice is used for the purpose of causing the cream to be more quickly separated from the milk without diluting or spoiling the milk.

One object is to enable the milk and cream to be drawn off and separated from each other with the least trouble to the operator and also to draw off the milk and cream or the water independently of each other and to refill each part without disturbing the other.

Another object is to so construct the separator that it can be taken apart and cleaned with the least trouble and will possess sufficient strength and rigidity to prevent its being easily injured or destroyed.

With these objects in view my invention consists in the improved construction and novel arrangement of parts of a separator, as will be hereinafter more fully set forth.

In the accompanying drawings, in which the same reference-numerals indicate corresponding parts in each of the views in which they occur, Figure 1 is a perspective view of a cream-separator made in accordance with my invention. Fig. 2 is a longitudinal vertical section, and Fig. 3 is a perspective view of the water-tank.

Referring more particularly to the drawings, 1 indicates the outer can or milk-receptacle of my improved separator, which can be made of any suitable size and dimensions and from any suitable material, heavy tin being preferred. The top of said receptacle or can is preferably conical and provided with a large-sized opening or mouth for the insertion of the water-tank 2. The edge of the opening is preferably strengthened by being bent over a strong wire 3, which extends inwardly and is adapted to engage with a similar wire 4, beaded or otherwise suitably secured upon the outside of the upper end of the water-tank. A flange 5 is preferably secured around the wired portion of the tank for the reception of a similar flange 6, projecting downwardly from the lower surface of the cover 7.

The lower portion of the can is provided at a suitable distance above its lower end with an inclined bottom 8. A suitable faucet 9 is secured in an opening in the side of the can at the lower edge of the bottom 8, so that the contents of the can may be completely emptied or drawn off through the faucet.

Two sight-gages 10 and 11 are secured in the side of the can, one at the top and the other at the bottom, preferably in a line directly above the faucet, for the purpose of separating the milk and the cream.

A strainer 12 is located in the top at one side of the mouth or opening of the can, through which the milk is poured into the can and by means of which the animal heat from the milk is permitted to escape.

The lower end of the tank 2 is preferably formed slightly tapering and is provided at its lowest point with an opening, around which projects a short flange 13.

Below the bottom of the outer can is arranged a series of braces 14, one of which is formed from a pipe which projects through the wall of the can at one end and has its inner end formed into a short funnel-like receptacle 15, which projects through the bottom of the can for the reception of the flange 13 at the bottom of the tank.

A suitable plug or stopper 16 is secured at the lower end of a rod 17 for closing the opening in the lower end of the tank. The upper end of the rod may be detachably or permanently secured within a suitable clamp 18 at the top of the tank.

The upper end of the tank is provided with oppositely-located inwardly-extending handles 19, by means of which the tank is inserted into and removed from the can. The can is also preferably provided with similar outwardly-extending handles 20, by means of which it may be moved from place to place.

In using my improved cream-separator the tank is filled with cold water or ice, as the case may be, and inserted through the top of the can, with its flanged upper end resting upon the flanged mouth of the can, which will cause the lower end of the can to rest with its flange within the funnel-like end of the delivery-pipe leading through the bottom of the can. The milk is then poured through the strainer until the gage at the top shows that it has reached a sufficient height. In due time the cream will rise to the top of the milk, the presence of the cold water or ice facilitating the separation. After the separation has taken place the faucet at the bottom of the can is opened, which will permit the milk to escape. By looking through the bottom gage the operator can see when the milk has all escaped, when he can turn the faucet, preventing the escape of the cream until after the milk-receptacle has been removed and a receptacle put in its place for the reception of the cream, after which the faucet is again opened and the cream is permitted to escape. In this manner the milk and cream can be quickly and easily separated without danger of loss of any of the cream, as it will remain upon the top of the milk until the last drop has been withdrawn. After the can has been emptied in this manner the plug is withdrawn from the opening in the bottom of the tank, which will permit the contents of the tank to pass out through the pipe beyond the outside of the can, thereby permitting of the complete emptying of the can in an easy and expeditious manner.

If at any time it should be desirable to change the water in the tank, the plug or stopper at the bottom can be withdrawn and the tank refilled without disturbing the milk and cream, thereby permitting of a more rapid cooling of the milk than could be secured without such a change of water in the tank. If desired, the pipe 14 could be provided with a faucet at its outer end, in which case the can might be filled before the tank is inserted, after which the tank could be placed in the can, which would cause the milk to rise upon all sides of it, the faucet in the pipe preventing the loss of any of the milk except the small quantity that it would require to fill the pipe. As soon as the tank was inserted the funnel would be closed, and the faucet could be opened and the milk within the pipe be permitted to escape, although no damage would be done if the milk in the pipe were permitted to remain until washed out by the passage of the water from the tank when the plug was withdrawn.

Although I have shown what I consider to be the most desirable form of constructing my improved cream-separator, yet I reserve the right to make such changes and alterations therein as will come within the scope of my invention.

Having thus fully described my invention, what I claim as new, and desire to secure by Letters Patent, is—

A cream-separator comprising an outer receptacle formed at its upper end with a centrally-disposed opening having an inwardly-extending bead and an upwardly-extending flange, and formed laterally of said opening with a filling-opening having a flange surrounding same and covered by a perforated plate, a removable cylindrical vessel having an open top and an outwardly-extending bead surrounding the top to rest upon the inwardly-extending bead of the outer receptacle and formed with a conical bottom having a central opening and a flange surrounding and depending from the same, said outer receptacle having an inclined bottom formed with a central perforation, braces below said bottom, one of which is hollow and has its outer end extending through the wall of the outer receptacle, and its inner end curved upwardly and projecting through the perforation in the bottom wall thereof and receiving the depending flange carried by the conical bottom of the inner vessel, a faucet in the wall of the outer receptacle and communicating with the interior thereof on a level with the lowest part of the inclined bottom, a plug closing the opening in the conical bottom of the inner vessel, an upwardly-extending operating-rod connected with said plug, and a removable cover having a flange fitting on the inner side of the upwardly-extending flange of the outer receptacle and closing the upper end of the inner vessel, substantially as described.

ALLEN L. MINIUM.

Witnesses:
W. B. SMITH,
ALBERT CHATTIN.